UNITED STATES PATENT OFFICE.

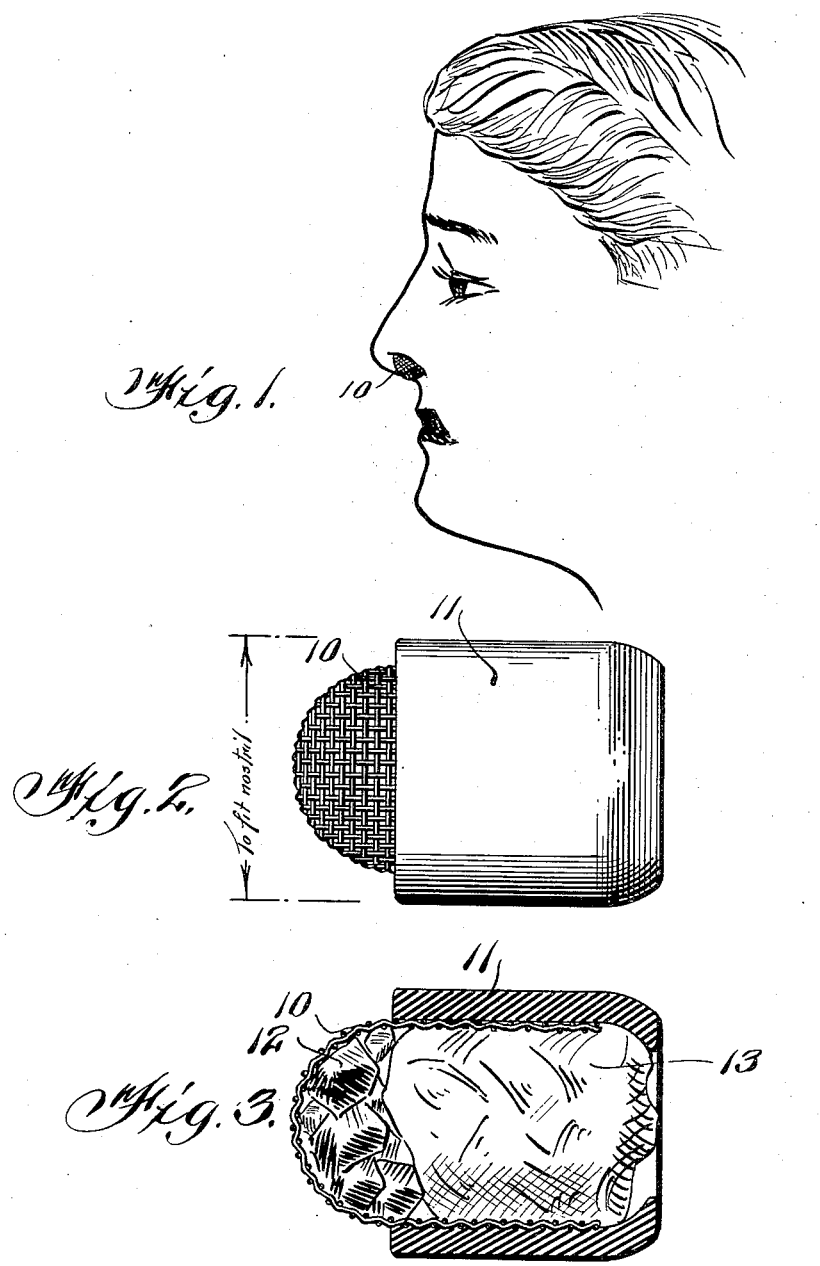

JACOB ADLER, OF NEW YORK, N. Y.

RESPIRATOR.

1,071,015.  Specification of Letters Patent.  Patented Aug. 26, 1913.

Application filed March 7, 1912. Serial No. 682,289.

*To all whom it may concern:*

Be it known that I, JACOB ADLER, citizen of the United States, residing at New York, in the county of New York and State of New York, have invented certain new and useful Improvements in Respirators; and I do hereby declare the following to be a full, clear, and exact description of the invention, such as will enable others skilled in the art to which it appertains to make and use the same.

This invention relates to respirators and has for an object to provide a device which will prevent the passage of the major portion of a cloud of dust therethrough and which will arrest the small portion which tends to pass therethrough.

A further object of my invention is to provide a device having a body portion and in which body portion a filtering mass may be inserted which filtering mass may be renewed as often as desired.

A further object of my invention is a provision of a mesh shield having a protecting band thereabout, which shield is adapted to contain a filtering mass and said filtering mass and shield being adapted to receive a bath of oil or the like and said oil tending to arrest the passage of dust through the shield.

Further objects will be apparent from the following specification, appended claims and drawings thereof in which—

Figure 1 is a view of the device applied, Fig. 2 is a side elevation, and Fig. 3 is a vertical sectional view therethrough.

Referring more specifically to the drawings, there is shown a shield 10 of wire mesh and said shield is shaped as shown having one end thereof rounded and a portion extending therefrom substantially cylindrical in form. The cylindrical portion is protected by the band 11 which may be made of rubber or any like substitute which will meet the requirements of such a device and the edge of said band extending beyond the shield tapers somewhat as to form a reduced opening through which a filter mass 12 may be inserted after which a sponge 13 is inserted to retain the filter mass in proper position.

When the device is desired for use the filter mass is positioned therein as above described, then the device may be dipped in a light machine oil or the like so as to saturate the sponge and the mesh, after which the device is blown through so as to remove the greater quantity of the oil or the like therefrom so as to leave a thin film of the liquid on the several parts desired, so that any dust passing through the wire mesh tends to collect on the moistened surface.

When the device is not in use, it may be kept in a container having waste therein, which is saturated with oil or the like so that by capillary attraction, the shield and contents are kept moist. As shown in the drawing the device is made sufficiently small so that one may be placed within each of the nostrils of a mechanic or the like working in a dusty or a smoky atmosphere, as for instance firemen, buffers, and the like.

I am aware that various modifications may be made in the scope of my invention and I do not restrict myself to the form shown in the drawings but submit them for illustrative purposes only and

Having thus described my invention, I claim:

1. In a respirator, a mesh shield having a cylindrical portion thereof, a rubber band encircling said cylindrical portion and extending therebeyond forming a reduced opening, a filter mass inserted through and retained by said reduced opening, and oil applied to said shield and filter mass to saturate the same.

2. In a respirator, a wire mesh cylindrical shield having one end thereof rounded, a band of rubber encircling said cylindrical portion and extending therebeyond, to form a reduced opening, a removable filter mass and retainer inserted in said shield through said reduced opening and said filter mass and shield being saturated with oil.

In testimony whereof I affix my signature in presence of two witnesses.

JACOB ADLER.

Witnesses:
 HUGO MOCK,
 GEORGE L. THOM.